(12) United States Patent
Gorman

(10) Patent No.: US 6,519,721 B1
(45) Date of Patent: Feb. 11, 2003

(54) METHOD AND APPARATUS TO REDUCE THE RISK OF OBSERVATION OF PROGRAM OPERATION

(75) Inventor: Steven D. Gorman, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/314,639

(22) Filed: May 19, 1999

(51) Int. Cl.⁷ .................................................. G06F 11/00
(52) U.S. Cl. .......................................... 714/48; 714/34
(58) Field of Search ................................ 714/48, 47, 45, 714/38, 39, 34, 35, 25; 713/200, 201

(56) References Cited

U.S. PATENT DOCUMENTS

| | | | | |
|---|---|---|---|---|
| 5,446,864 A | * | 8/1995 | Burghardt et al. | 395/427 |
| 6,006,328 A | * | 12/1999 | Drake | 713/200 |
| 6,061,518 A | * | 5/2000 | Hoffman | 395/704 |
| 6,076,149 A | * | 6/2000 | Usami et al. | 711/163 |
| 6,182,208 B1 | * | 1/2001 | Peri et al. | 712/227 |
| 6,237,137 B1 | * | 5/2001 | Beelitz | 717/4 |
| 6,249,881 B1 | * | 6/2001 | Porten et al. | 714/38 |
| 6,272,636 B1 | * | 8/2001 | Neville et al. | 713/189 |

* cited by examiner

Primary Examiner—Nadeem Iqbal
(74) Attorney, Agent, or Firm—Blakely, Sokoloff, Taylor & Zafman LLP

(57) ABSTRACT

A method includes first, disabling debug support for a program such that debug support may not be re-enabled for the program until execution of the program by a processor terminates. Second, data signals external to the program are read to determine program operation.

15 Claims, 2 Drawing Sheets

METHOD AND APPARATUS TO REDUCE THE RISK OF OBSERVATION OF PROGRAM OPERATION

BACKGROUND

FIELD

The invention relates to software security and, more particularly, to reducing the risk of unwanted observation of a program's operation.

BACKGROUND INFORMATION

A software program typically includes a sequence of instructions stored in a memory and executed by a processor. As used herein, the term "program" may refer to any form of packaging (that is, organizing and grouping) sequences of software instructions. The term "program" may refer to executable programs, statically-linked libraries, dynamically-linked libraries, applets, and many other forms of packaging and organization for software sequences well known in the art.

It is often desirable to make it more difficult for unauthorized persons to observe the operation of a program. This may be done to protect trade secrets or to help prevent unauthorized copying of the program, among other reasons. Many techniques exist for this purpose. One such technique involves applying data signals external to a program to affect the execution of the program. During program execution, the external data signals are read by the program from an external memory and applied to determine the execution flow of the program, decrypt instructions or data employed during execution, or to test the integrity of the program. The data signals may be stored in the external memory as digital binary signals, e.g. bits, in manners well known in the art.

Unauthorized third parties may attempt to ascertain a program's operation by inspecting a static listing of the sequence of instructions in the program. A static listing, in this context, is a listing of the instructions in the program while the program is not executing on a processor. For example, a disassembler may be employed to list the instructions of the non-executing program. When the execution of the instructions is determined by data signals read at execution time, a person employing a disassembler may be unable to determine the program's operation from the static listing.

One disadvantage to this technique is that a third party employing an execution-time debugger may step through the program once the external data is read to observe the program's operation. Debuggers typically rely upon certain features of the processor to enable their operation. For example, the processor may support a "break point" interrupt to assist the debugger in pausing program execution when a selected instruction address is encountered. For example, the Intel Pentium® processor employs the INT 3 instruction for such a purpose. The processor may provide a "step" interrupt to assist the debugger in stepping through program execution one instruction at a time, and the processor may comprise special debug registers for specifying instruction addresses or memory locations at which program execution may be paused.

Some processors may support the disabling of debug support by executing a special instruction. Disabling processor debug support results in the processor not supporting one or more of such debug facilitating features. Such disabling of debug support is typically temporary until such time as the same or another program in the system executes an instruction to re-enable debug support.

It would be advantageous to increase the level of difficulty for persons attempting to ascertain the operation a program using static listings or run-time debuggers.

SUMMARY

Debug support for a program is first disabled such that debug support can not be re-enabled for the program until execution of the program by a processor terminates. Data signals external to the program are then read to determine program operation.

BRIEF DESCRIPTION OF THE DRAWINGS

The subject matter regarded as the invention is particularly pointed out and distinctly claimed in the concluding portion of the specification. The invention, however, may be further understood by reference to the following detailed description read with reference to the accompanying drawings.

DETAILED DESCRIPTION

Figure 1:
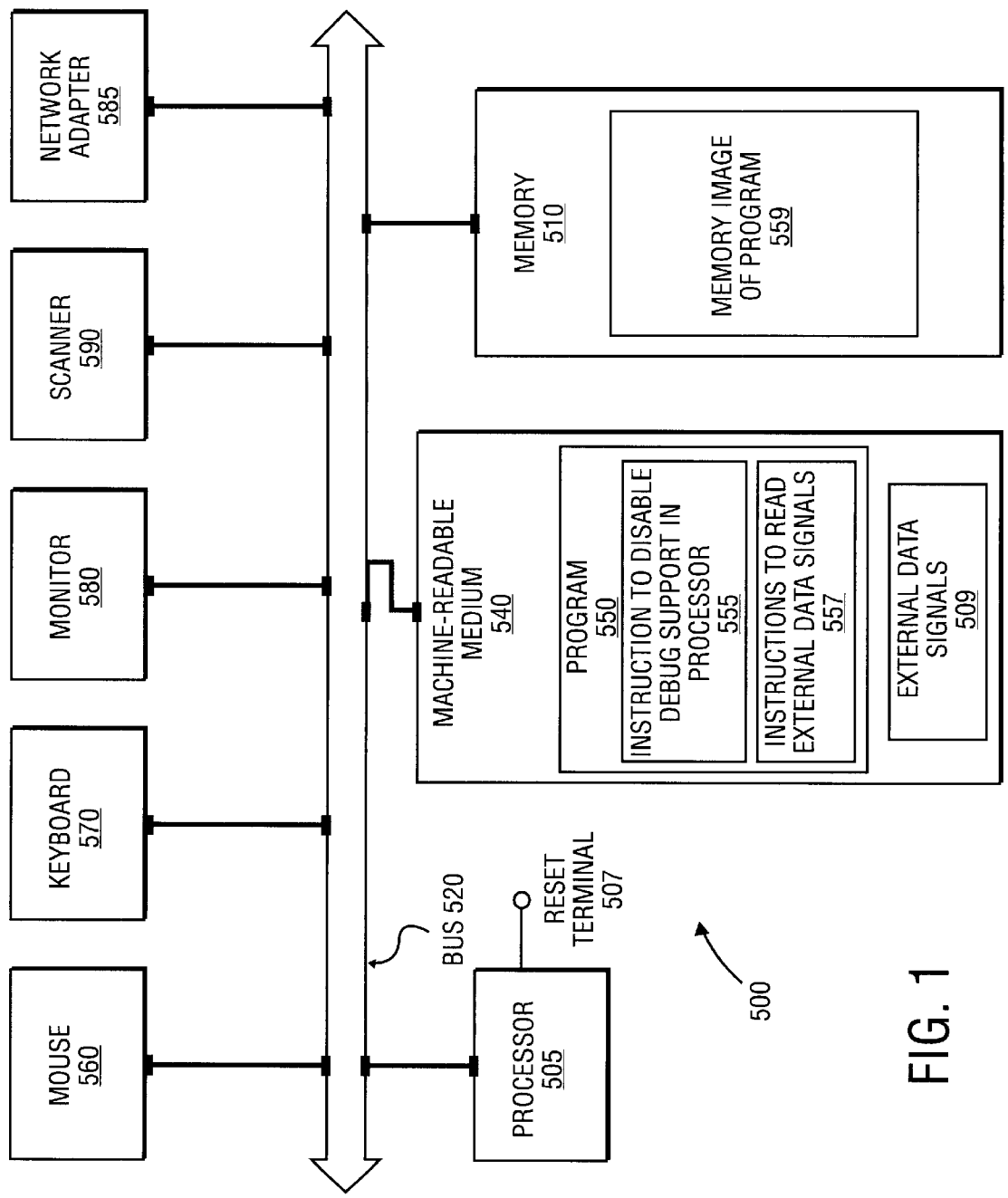
FIG. 1 is a schematic diagram illustrating an embodiment of a device in accordance with the present invention.

The embodiments described herein are merely illustrative, and one skilled in the art will appreciate that numerous modifications can be made which nonetheless fall within the scope of the present invention.

In accordance with one embodiment of the invention, a software program includes an instruction to disable debug support for the program. Debug support is disabled until such time as the program execution terminates, and possibly longer. Subsequent to execution of the disable instruction, the program reads data signals which may be applied to determine the operation of the program. Thus, an unauthorized third party may be inhibited from observing details of the program's operation from a static listing. (Of course, the program is not actually "operating" when it is not executing, however, details of the program's methods of operation may be observed from a static listing.). Disabling debug support in the processor may also inhibit observation of the program's operation during execution, using a debugger.

To detect deletion, addition, or modification of instructions in the program, an integrity check may be performed on the program at various times during execution. The integrity check may determine whether someone has altered the program in order to bypass the disabling of debug support or for some other reason. One technique for performing an integrity check, well known in the art, is to generate a hash value over the binary sequence comprising the sequence of instructions to verify. This hash value may be compared with a hash value determined from the instruction sequence in a known, unaltered form. If the hashes match, the instruction sequence is verified and may continue execution. Otherwise, the instructions may have been altered and may terminate execution.

In one embodiment, the execution of a single instruction may result in both the disabling of debug support and the reading of data signals to determine program operation. Removing or replacing the instruction also eliminates the return of the data signals which determine program operation. For example, an instruction may cause the processor to transfer control to a BIOS or firmware routine. The routine may be responsible for both disabling processor debug support and returning the external data signals back to the program. In one embodiment, the disabling of processor debug support is inherent in the instruction itself. That is, debug support is disabled without the need to execute additional instructions. For example, the Intel Pentium® processor supports the well-known CALL instruction to transfer execution flow from a current instruction address in a program to a possibly non-sequential instruction address. In accordance with the present invention, the CALL instruction may be enhanced to disable processor debug support in addition to transferring execution flow. Enhancing the CALL instruction may involve configuration of the circuitry of the processor such that receipt of the CALL instruction by the processor circuits results in disabling of the processor debug support. This is merely one of a great many possibilities for implementing the present invention, and those skilled in the art will appreciate that numerous other instructions could be enhanced, or and additional instruction or instructions added to the processor, for this purpose.

FIG. 1 shows an embodiment 500 of a device in accordance with the present invention. Embodiment 500 comprises a processor 505 to execute instructions supplied from a bus 520. The executed instructions are stored in a memory 510 from which they are supplied to the processor 505 by the bus 520 for execution. The processor 505 may be implemented using any semiconductor fabrication technology and may execute any instruction set including, but not limited to, instruction sets supported by an Intel Corporation Pentium® processor or compatible processor. The bus 520 may be implemented using technologies for propagating signals including, but not limited to, electronic and optical conductors. The memory may include random access memory (RAM), read-only memory (ROM), or any other form of memory capable of storing instructions which may then be supplied to the processor 505 by the bus 520 for execution. Embodiment 500 may include a machine-readable storage medium 540 to store sequences of instructions which may be loaded into volatile memory 510 from which they may be supplied to processor 505 for execution. The machine-readable storage medium 540 may include, but is not limited to, a hard drive, a floppy drive, and a CD-ROM or other optical disk.

One skilled in the art will appreciate that in "diskless" devices without mass storage mediums, the machine-readable storage medium 540 may be omitted from the embodiment 500. Instructions may then be stored in RAM, ROM, or other memory from which instructions may be directly accessed over the bus 520 by the processor 505 for execution.

To perform signal input/output, embodiment 500 may comprise a mouse 560, a keyboard 570, a display 580, and a scanner 590, each coupled to the bus 520 for transmitting data so that it may be easily accessed or manipulated by a user. The embodiment 500 may further include a network adapter 585 to couple the embodiment 500 to a network. Of course, the invention is not limited in scope to this particular embodiment.

In accordance with the present invention, embodiment 500 may comprise a program 550 stored on the machine-readable storage medium 540. In manners well known in the art, program 550 may be loaded into memory 510 to create a memory image 559 suitable for execution by processor 505.

The program 550 comprises a sequence of instructions to execute on the processor 505. One of the sequence of instructions is an instruction 555 to disable processor debug support. In one embodiment the instruction 555 may cause processor debug support to be disabled until the processor 505 is reset to an initial state (sometimes called a "hard reset"). In one embodiment, a hard reset may be accomplished by asserting a signal on a reset terminal 507 of the processor 505. As a result of the hard reset, the processor's registers and state information may be reset to predetermined initial values and all currently executing programs may be terminated. Of course, the invention is not limited to the use of hard reset.

In another embodiment, an instruction in the program 550 disables debug support for the program 550 until another instruction in the program 550 re-enables debug support. In other words, only the program which disables debug support may re-enable debug support for that program. Other programs (perhaps a second program executing on the same processor 505 in the background) are prevented from re-enabling debug support for the program which disabled debug support. This limitation on re-enabling debug support may be enforced by the processor which received the instruction to disable debug support. In an alternate embodiment, debug support may be disabled for the program 550 until such time as the program ceases to execute on the processor.

As previously described, the instruction 555 to disable debug support may also perform other operations, such as transferring control to a non-sequential instruction address. Subsequent to disabling debug support, instructions 557 may be executed to read data signals 509 from a storage location external to the program 550 comprising the instructions. In other words, the program 550 may comprise instructions and data which occupy storage locations on medium 540 or in memory 510. The data signals 509 may occupy storage locations other than those occupied by the instructions and data comprised by the program 550. Possible storage locations for the external data signals 509 include a nonvolatile computer hard disk, a read-only memory, a random-access memory, and a flash memory, among numerous possibilities. Instructions 557 for reading external data signals 509 are well known in the art and are not described in detail here in the interest of not obscuring of the present invention.

The program 550 applies the data signals 509 to determine the program's operation. To illustrate one of numerous possibilities, consider data signals 509 representing numeric values of ten, five, and fifteen. In a manner well known in the art, the program 550 may assign these signal values to a set of variables, herein named a, b, and c. The program 550 may then apply the variables to determine execution flow. One possible manner in which the program 550 may apply the variables is using decision points. Decision points are also well-known in the art. One manner of implementing decision points is using jump instructions. For example, the Intel Pentium® processor supports a "jump not equal" instruction (JNE) which may be employed to transfer control to a non-sequential instruction address when the result of comparing two values indicates the values are unequal. The following represents an expression in a high level programming language, such as the "C" programming language. When compiled to assembly language on Pentium® processor platforms, such an expression may comprise the JNE instruction described earlier.

if (a !=10) { //do instruction block #1 } else { //do instruction block #2 }

Those skilled in the art will no doubt recognize many other and possibly more sophisticated applications of the external data signals 509 which may be applied to control the program's operation, such as decrypting program instructions and data and testing the integrity of the program 550.

As previously described, the program 550 may comprise the instructions which read the data signals 509 from the external location, instead of relying upon a routine external to the program for such purpose (such as a BIOS or firmware routine). It will be understood by those skilled in the art that not all processors may support disabling of debug support until such time as a program terminates, or longer.

Those skilled in the art will appreciate that the processor 550 need not comprise the circuits which provide debug support. In other words, debug support circuits in packages separate from the processor circuit package may be employed. It will also be understood that processor debug support might be provided by sequences of instructions executing on the processor 550, instead of by hardware circuits within the processor. In other words, debug support may be provided by software emulation. All such means of providing debug support are contemplated within the scope of the present invention.

Figure 2:
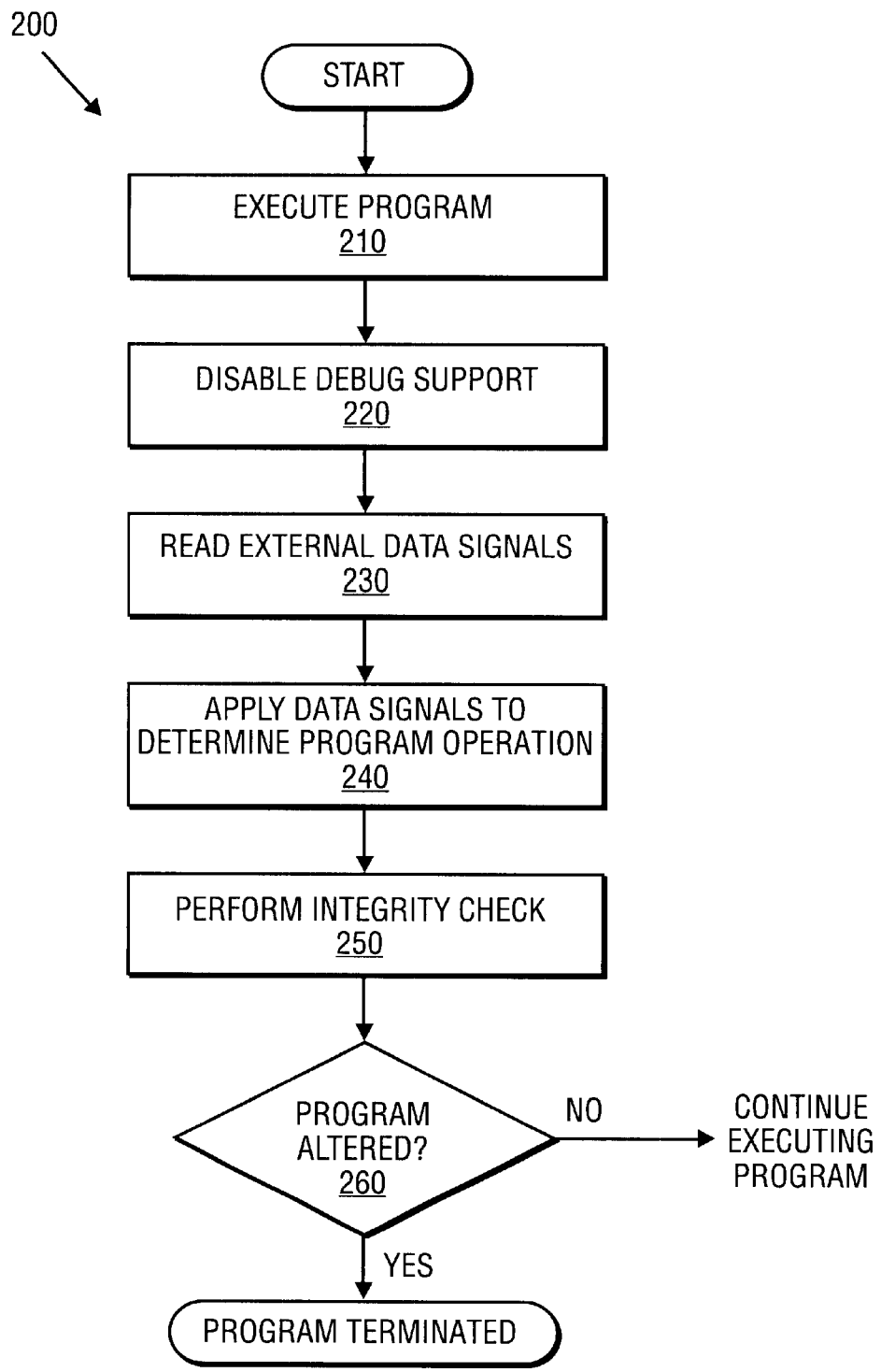
FIG. 2 is a flow chart illustrating an embodiment of a method in accordance with the present invention.

FIG. 2 is a flow chart illustrating an embodiment 200 of a method to reduce the risk of observation of program operation, in accordance with the present invention. A program begins to execute on a processor at 210. An instruction or instructions are encountered which disable processor debug support at 220. For example, the instruction may disable debug support until such time as another instruction in the program re-enables debug support, until such time as the program terminates, or until such time as the processor is reset. Data signals are then read from an external source at 230. External sources may include a computer hard drive or other memory location not comprised by the program data or instructions. The data signals are applied to determine program operation at 240. As a result of disabling processor debug support, a person attempting to observe program operation using a run-time debugger may find the debugger unresponsive to breakpoint and step commands applied to the program, among other things. An integrity check may be performed on the program at 250 to ascertain whether any instructions in the original program sequence have been added, altered or replaced. If the integrity check determines that no alterations have occurred, the program execution continues at 260, otherwise program execution may terminate.

While certain features of the invention have been illustrated as described herein, many modifications, substitutions, changes and equivalents will now occur to those skilled in the art. It is, therefore, to be understood that the appended claims are intended to cover all such embodiments and changes as fall within the true spirit of the invention.

What is claimed is:

1. A method comprising:
    first, prior to reading data signals external to a program, disabling debug support for the program such that debug support can not be re-enabled for the program until execution of the program by a processor terminates; and
    second, reading data signals external to the program to determine program operation.

2. The method of claim 1 in which disabling debug support further comprises: executing an instruction to disable debug support by the processor.

3. A method comprising:
    first, prior to reading data signals external to a program, executing a first instruction comprised by a program to disable debug support for the program until such time as a second instruction comprised by the program to re-enable debug support is executed; and
    second, reading data signals external to the program to determine program operation.

4. The method of claim 3 in which executing the first instruction to disable debug support further comprises:
    transferring control to a routine to read the data signals.

5. A method comprising:
    adapting a program to comprise a first instruction which, when executed by a processor, disables debug support for the program, prior to reading data signals external to a program, until such time as the program re-enables debug support;
    adapting the program to read data signals external to the program to determine program operation during execution of the program by the processor; and
    adapting the program to comprise a second instruction which, when executed by the processor, re-enables debug support for the program.

6. An article comprising:
    a machine-readable medium having stored thereon a program comprising a sequence of instructions which, when executed by a data processing device, cause the data processing device to:
        first, prior to reading data signals external to a program, disable, debug support for the program such that debug support may not be re-enabled for the program until execution of the program terminates; and
        second, read data signals external to the program to determine program operation.

7. The article of claim 6 in which the program further comprises an instruction which when executed by the data processing device cause the data processing device to:
    disable debug support by a processor comprised by the data processing device.

8. An article comprising:
    a machine-readable medium having stored thereon a program comprising a sequence of instructions which, when executed by a data processing device, cause the data processing device:
        first, to execute a first instruction comprised by the program to disable debug support for the program, prior to reading data signals external to the program, until such time as a second instruction comprised by the program to re-enable debug support is executed; and
        second, to read data signals external to the program to determine program operation.

9. The article of claim 8 in which the first instruction, when executed, further:
    transfers control to a routine to read the data signals.

10. An article comprising:
    a machine-readable medium having stored thereon a program comprising a sequence of instructions which, when executed by a data processing device, cause the data processing device to:
        prior to reading data signals external to the program, disable debug support for the program until such time as the program re-enables debug support;
        read data signals external to the program to determine program operation during execution of the program; and
        re-enable debug support for the program.

11. A device comprising:

a processor;

a machine-readable storage medium coupled to the processor by way of a bus, the storage medium storing a program comprising a sequence of instructions which, when executed by the processor, cause the device to first, prior to reading data signals external to the program, disable debug support for the program such that debug support can not be re-enabled for the program until execution of the program terminates; and second, read data signals external to the program to determine program operation.

12. The device of claim 11 in which a machine-readable storage medium in which the sequence of instructions comprise and instruction which, when executed by the processor, cause the device to:

disable debug support by the processor.

13. A device comprising:

a processor;

a machine-readable storage medium coupled to the processor by way of a bus, the storage medium storing a program comprising a sequence of instructions which, when executed by the processor, cause the device to:

first, execute a first instruction comprised by the program to disable debug support for the program, prior to reading data signals external to a program, until such time as a second instruction comprised by the program to re-enable debug support is executed; and second, read data signals external to the program to determine program operation.

14. The device of claim 13 in which the first instruction, when executed, further:

transfers control to a routine to read the data signals.

15. A device comprising:

a processor;

a machine-readable storage medium coupled to the processor by way of a bus, the storage medium storing a program comprising a sequence of instructions which, when executed by the processor, cause the device to:

prior to reading data signals external to the program, disable debug support for the program until such time as the program re-enables debug support;

read data signals external to the program to determine program operation during execution of the program; and re-enable debug support for the program.

* * * * *